United States Patent [19]

Shier et al.

[11] Patent Number: 5,165,298
[45] Date of Patent: Nov. 24, 1992

[54] THROTTLE CABLE LINKAGE

[75] Inventors: Richard K. Shier, Livonia; Calvin White, Detroit, both of Mich.

[73] Assignee: General Motors Corporation, Detroit, Mich.

[21] Appl. No.: 773,338

[22] Filed: Oct. 8, 1991

[51] Int. Cl.⁵ .................... F16C 1/10; F02D 11/10
[52] U.S. Cl. .................... 74/502.6; 74/500.5; 74/501.5 R; 123/399; 123/396
[58] Field of Search ............ 74/500.5, 501.5 R, 501.6, 74/502.4, 502.6, 513; 123/399, 396, 397, 398; 180/197; 364/426.04

[56] References Cited

U.S. PATENT DOCUMENTS

| | | | |
|---|---|---|---|
| 4,703,823 | 11/1987 | Yogo et al. | 180/197 |
| 4,714,864 | 12/1987 | Yogo et al. | 318/52 |
| 4,747,380 | 5/1988 | Ejiri et al. | 123/399 |
| 4,759,184 | 7/1988 | Kita | 123/396 X |
| 4,776,563 | 10/1988 | Pascall | 251/129.03 |
| 4,809,656 | 3/1989 | Suzuki | 123/399 X |
| 4,856,477 | 8/1989 | Hanaoka et al. | 123/399 |
| 4,867,122 | 9/1989 | Kono et al. | 123/396 |
| 4,938,304 | 7/1990 | Yamaguchi et al. | 123/399 X |
| 4,958,607 | 9/1990 | Lundberg | 74/513 X |
| 4,961,355 | 10/1990 | Irino et al. | 74/513 |
| 4,995,363 | 2/1991 | Terazawa et al. | 123/399 |
| 5,076,231 | 12/1991 | Büchl | 123/399 |

OTHER PUBLICATIONS

AC Rochester Division, General Motors Corporation, "1989 New Product Information" Publication No. 90-1989; pp. 1, 2, 13, 23, 25-27.

Primary Examiner—Vinh T. Luong
Attorney, Agent, or Firm—Gordon F. Belcher

[57] ABSTRACT

A throttle cable linkage for a throttle valve comprises a throttle cam having a shaft opening enabling placement of the throttle cam on a throttle shaft of the throttle valve. The throttle cam includes a cable socket having a socket axis, an open socket inlet and a socket base. The throttle cam has a pilot trough and a ramp trough. The ramp trough has an interior ramp slot which extends along the length of the ramp trough and into the socket base. A throttle cable assembly includes a throttle cable and a cable knob. The throttle cable is sufficiently stiff so that control of a portion of it away from the cable knob can enable piloting of the cable knob through the pilot and ramp troughs causing the cable knob to fall toward the socket axis with the throttle cable falling through the ramp slot into the cable socket so that the cable knob is adjacent to the socket inlet. The stiffness of the throttle cable further enables application of a reverse force to the throttle cable to pull the cable knob into the cable socket.

2 Claims, 3 Drawing Sheets

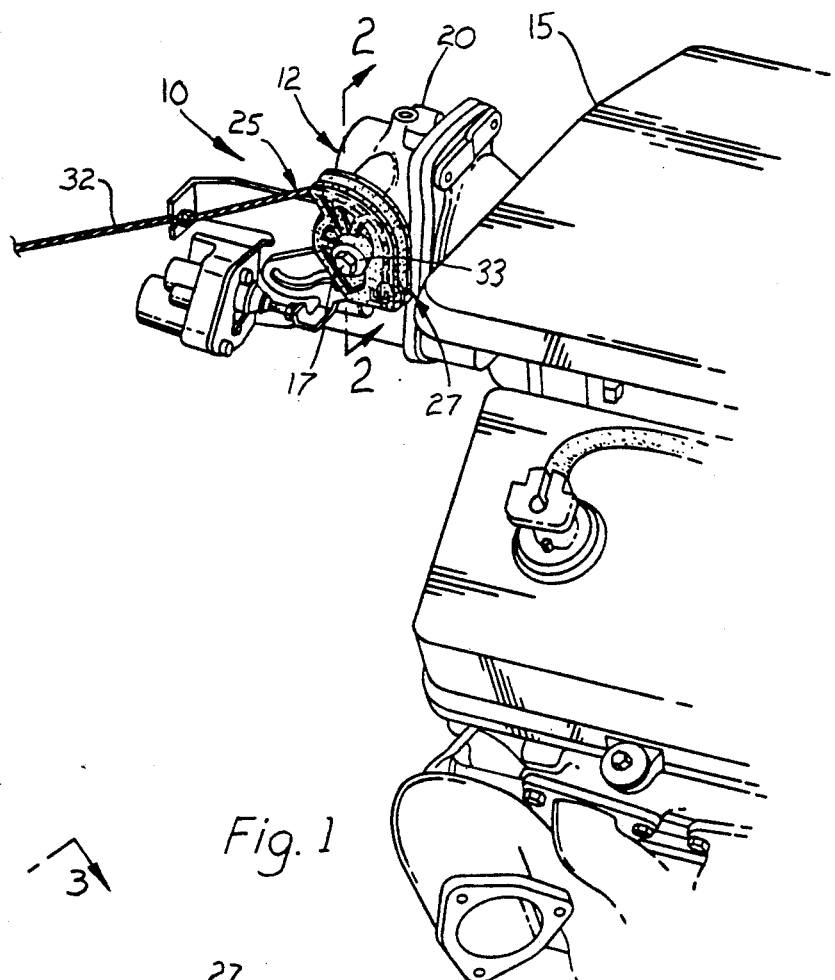
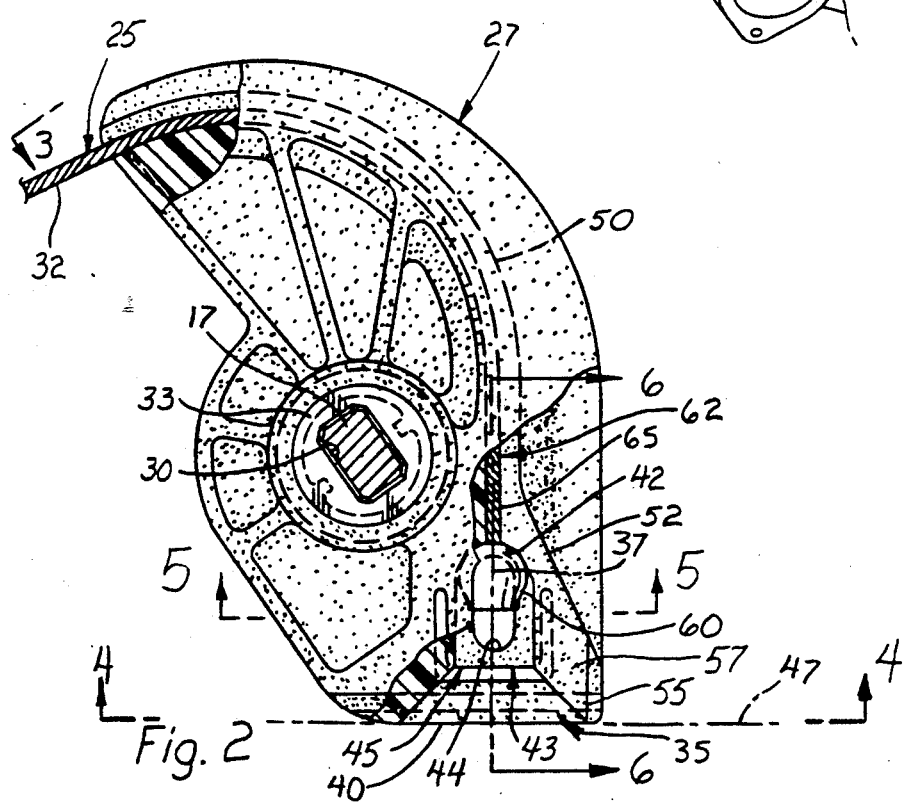
Fig. 1
Fig. 2

THROTTLE CABLE LINKAGE

TECHNICAL FIELD

This invention relates to a throttle cable linkage for a throttle valve, and more particularly to a throttle cable linkage which facilitates connection of a throttle cable assembly to a throttle cam which is mounted on the throttle shaft.

BACKGROUND

A throttle valve can include have a throttle cam mounted on a throttle shaft and a throttle cable which is coupled at one end to an accelerator pedal. The other end of the throttle cable is attached to the throttle cam so that displacement of the accelerator pedal causes rotation of the throttle cam and throttle shaft thereby varying the flow area around the throttle valve. Attachment of the throttle cable to the throttle cam can be difficult.

SUMMARY OF THE INVENTION

The present invention provides a throttle cable linkage for a throttle valve comprising a throttle cam having a shaft opening enabling placement of the throttle cam on a throttle shaft of the throttle valve. The throttle cam includes a cable socket having a socket axis, an open socket inlet and a socket base. The throttle cam has a pilot trough and a ramp trough. The ramp trough has an interior ramp slot which extends along the length of the ramp trough and into the socket base. A throttle cable assembly includes a throttle cable and a cable knob. The throttle cable is sufficiently stiff so that control of a portion of it away from the cable knob can enable piloting of the cable knob through the pilot and ramp troughs causing the cable knob to fall toward the socket axis with the throttle cable falling through the ramp slot into the cable socket so that the cable knob is adjacent to the socket inlet. The stiffness of the throttle cable further enables application of a reverse force to the throttle cable to pull the cable knob into the cable socket. Assembly of the throttle cable assembly to the throttle cam is thereby facilitated.

BRIEF DRAWING DESCRIPTION

In the drawings:

FIG. 1 is a perspective view of the throttle cable linkage of the present invention mounted on a throttle valve of an, engine;

FIG. 2 is an enlarged side view of the throttle cable linkage generally in the plane indicated by line 2—2 of FIG. 1 showing the throttle cable linkage with parts being broken away to show the engagement between the throttle cable assembly and the pilot trough and cable socket, and to show the wall of the cable socket;

Figure 3:
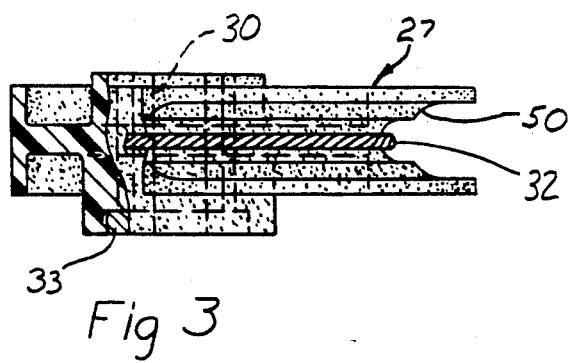
FIG. 3 is a plan view of the throttle cable linkage generally in the plane indicated by line 3—3 of FIG. 2 showing the throttle cable assembly with parts being broken away to show the interior cross section of the throttle cam and the metallic insert.
Figure 4:
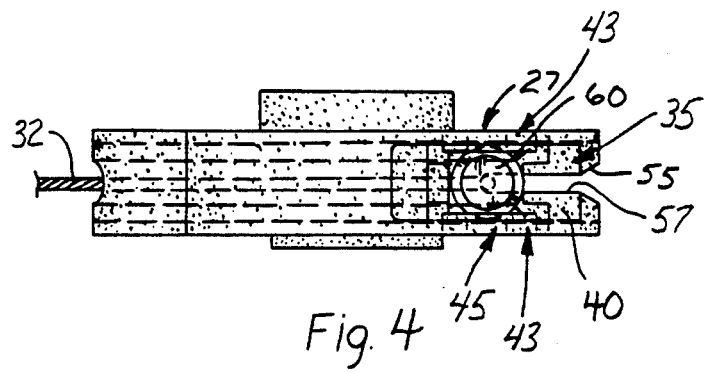
FIG. 4 is an upward view of the throttle cable linkage generally in the plane indicated by line 4—4 of FIG. 2 showing the cable socket and ramp slot.
Figure 5:
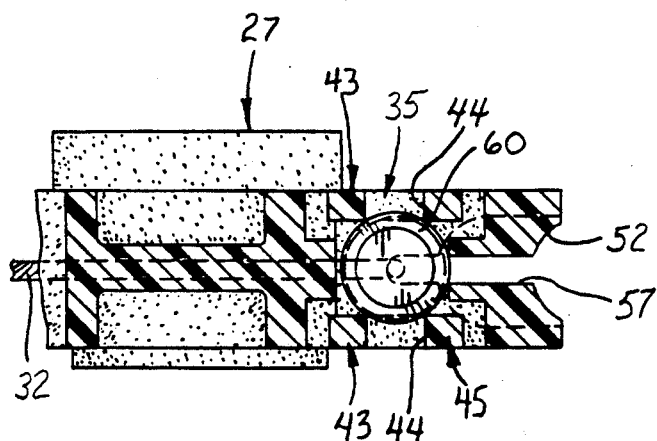
FIG. 5 is an upward sectional view of the throttle cable linkage generally in the plane indicated by line 5—5 of FIG. 2 showing the cable socket, ramp slot and ramp trough.
Figure 6:
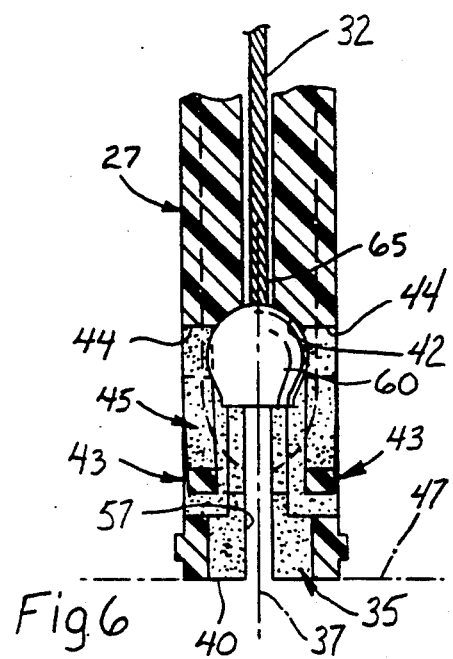

FIG. 6 is a forward sectional view of the throttle cable linkage generally in the plane indicated by line 6—6 of FIG. 2 showing the cable socket and ramp slot; and FIGS. 7A–7E are an assembly view of the throttle cable linkage showing the steps required to assemble the throttle cable assembly to the throttle cam with parts being broken away to show the engagement between the throttle cable assembly and throttle cam during various stages of the assembly.

Corresponding reference characters indicate corresponding parts throughout the several views of the drawings.

DETAILED DESCRIPTION

Referring to the drawings, and in particular, FIG. 1, numeral 10 generally refers to a throttle cable linkage for a throttle valve 12 of an engine 15. The throttle valve 12 includes a throttle shaft 17 which is rotatably mounted in a throttle body 20 and a throttle blade which is fixed to the throttle shaft. Rotation of the throttle shaft 17 varies the flow area through the throttle body 20 which can facilitate control of the operation of the engine 15.

The throttle cable linkage 10 comprises a throttle cable assembly 25 and a throttle cam 27. The throttle cam 27 has a shaft opening 30 enabling insertion of the throttle shaft 17 through the shaft opening 30 with the throttle cam 27 tightly fitted to the throttle shaft. Rotation of the throttle cam 27 about the shaft opening 30 thereby produces concomitant rotation of the throttle shaft 17.

The throttle cable assembly 25 includes a metallic throttle cable 32 which is connected to the throttle cam 27. The throttle cable 32 is typically coupled to the accelerator pedal so that angular displacement of the accelerator pedal causes displacement of the throttle cable along its axis. This causes rotation of the throttle cam 27 about the shaft opening 30 which causes the throttle shaft 17 to rotate thereby varying the flow area through the throttle body 20.

The throttle cam 27 has an eccentric lobe shape and is formed of a rigid plastic material having a metallic insert 33. The metallic insert 33 has a rectangular passage through it which defines the shaft opening 30. The shaft opening 30 has a rectangular cross section which interlocks with the end of the throttle shaft 17 to enable the concomitant rotation of the throttle shaft 17 and the throttle cam 27.

The throttle cam 27 has a cable socket 35 which has a socket axis 37. The cable socket 35 also has an open socket inlet 40 and a socket base 42. A portion of the walls of the cable socket 35 comprise retainer arms 43 which extend in a direction away from the socket base 42 toward the socket inlet 40. Each of the retainer arms 43 has an elliptical arm opening 44. The end of each retainer arm 43 is resilient and adjoins a portion of the cable socket 35 which constitutes a socket retainer 45. The minimum cross section of the socket retainer 45 in a plane which is perpendicular to the socket axis 37 constitutes a retainer cross section.

The socket axis 37 is spaced from the axis of the throttle shaft 17 in a radial direction with respect to the axis of the shaft opening 30. The socket axis 37 is perpendicular to a radial plane through the axis of the shaft opening 30. The cable socket 35 has a socket inlet plane 47 which contains the socket inlet 40 and is perpendicular to the socket axis 37.

The throttle cam 27 has a pilot trough 50 and a ramp trough 52 which are formed in the peripheral edge of the throttle cam 27. The throttle cam 27 has support ribs which extend radially from the area adjacent to the shaft opening 30. The pilot trough 50 is oriented with respect to the ramp trough 52 and cable socket 35 so that the ramp trough 52 and cable socket 35 branch from the pilot trough 50. The ramp trough 52 is spaced above the cable socket 35 in a radial direction away from the shaft opening 30. The orientation between the pilot trough 50, ramp trough 52 and cable socket 35 also results in the socket base 42 adjoining the pilot trough 50 and the axis of the portion of the pilot trough 50 which adjoins the socket base 42 being coaxial with the socket axis 37.

The ramp trough 52 has a ramp exit 55 which is constituted by the end of the ramp trough opposite from the pilot trough 50. The ramp exit 55 lies in the socket inlet plane 47. The ramp trough 52 has an interior ramp slot 57 which extends along the length of the ramp trough 52 enabling passage between the ramp trough and the cable socket 35. The ramp slot 57 extends into the socket base 42 enabling passage between the pilot trough 50 and the cable socket 35.

The throttle cable 32 has a thickness which is less than the width of the ramp slot 57. The throttle cable 32 also has a knob end 65.

The throttle cable assembly 25 also includes a cable knob 60 which is securely attached to the knob end 65. The cable knob 60 has a semispherical shape with the apex of the spherical portion being attached to the knob end 65. The non-semispherical portion of the cable knob 60 has a blunted cylindrical shape which is formed by the inlet of the cavity of the mold in which the cable knob 60 is formed.

The largest section of the cable knob 60 in a plane which is perpendicular to the axis of the knob end 65 constitutes a perpendicular knob cross-section. The perpendicular knob cross-section is smaller than the cross-section of the socket inlet 40. The perpendicular knob cross-section is larger than the socket base 42 and retainer cross section. The cable knob 60 has a perpendicular dimension with respect to the axis of the knob end 65 which is larger than the width of the ramp slot 57.

Assembly

Figure 7A:
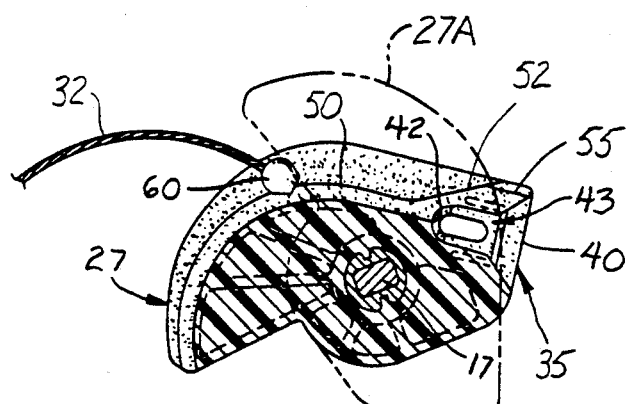

The throttle cable assembly 25 is connected to the throttle cam 27 by first rotating the throttle cam from its nonactuated position 27A, shown in phantom in FIG. 7A, to a position wherein the socket axis 37 is nearly horizontal. This can be accomplished by pushing the throttle blade to a nearly horizontal position.

Figure 7B:
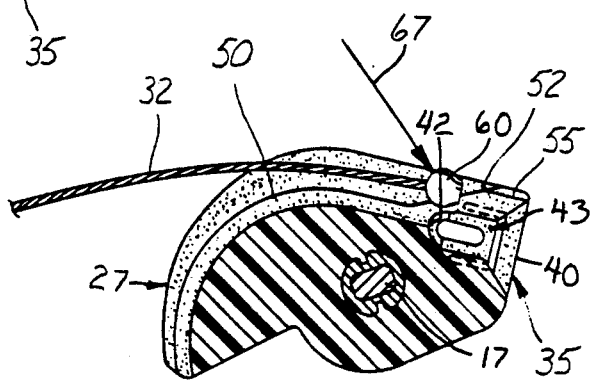
Figure 7C:
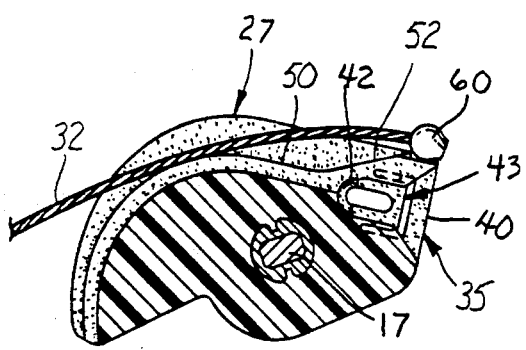
Figure 7D:
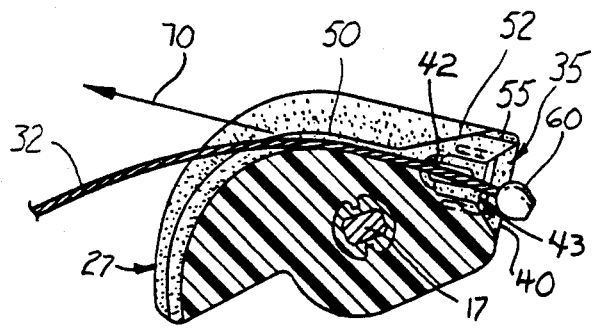

The throttle cable 32 is sufficiently stiff so that control of a portion of it away from the cable knob 60 can enable piloting of the cable knob into the pilot trough 50 and application of a ramp force indicated by numeral 67 to the cable knob 60, as shown in FIGS. 7A and 7B. The ramp force 67 is directed in part toward the interior of the pilot trough 50 and in part in a direction which is parallel to the socket axis 37. The ramp force 67 causes the cable knob 60 to pass through the pilot trough 50 toward the ramp trough 52. The ramp force 67 further causes the cable knob 60 to pass into and through the ramp trough 52. The ramp force 67 then causes the cable knob 60 to pass by the ramp exit 55 and fall through the socket inlet plane 47 toward the socket axis 37, as shown in FIGS. 7C and 7D. The throttle cable 32 falls through the ramp slot 57 into the cable socket 35 so that the cable knob 60 is adjacent to the socket inlet 40, as shown in FIG. 7D.

Figure 7E:
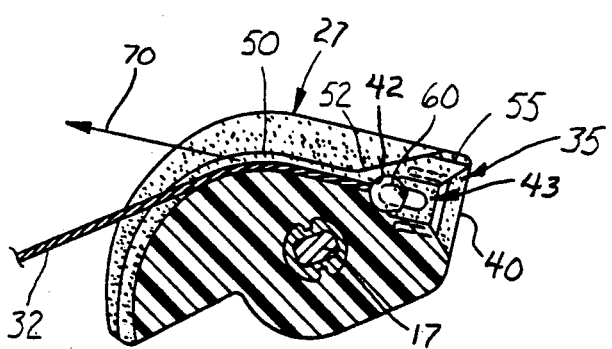

The throttle cable 32 further enables a reverse force indicated by numeral 70 to be applied to the throttle cable 32 in a parallel direction with respect to the socket axis 37, as shown in FIG. 7E. Application of the reverse force 70 to the throttle cable 32 results in the cable knob 60 being pulled through the socket inlet 40 into the cable socket 35.

Continued application of the reverse force 70 to the throttle cable 32 results in the cable knob 60 being pulled through the socket retainer 45 resulting in the ends of the retainer arms 43 spreading apart. The cable knob 60 is thereby able to enter a portion of the cable socket 35 between the socket base 42 and socket retainer 45 resulting in the cable knob 60 being captured therein. When in this portion of the cable socket 35, the cable knob 60 extends into the arm openings 44 allowing the ends of the retainer arms 43 to move inward toward the socket axis 37 to return to their positions prior to the passage of the cable knob 60 through the socket retainer 45. The ends of the retainer arms 43 thereby obstruct passage of the cable knob 60 through the cable socket 35 toward the socket inlet 40.

Continued application of the reverse force 70 causes the cable knob 60 to lodge against the socket base 42 and rotate the throttle cam 27 about the shaft opening 30. The end of the throttle cable 62 opposite the knob end 65 is coupled to the accelerator pedal so that displacement of the pedal causes displacement of the throttle cable 32 along its axis. This causes rotation of the throttle shaft 17 thereby causing variations in the flow area through the throttle body 20 to control the operation of the engine 15.

The throttle cable assembly 25 can be detached from the throttle cam 27 by disconnecting the throttle cable 32 from the accelerator pedal and positioning the throttle cable 62 so that the knob end 65 extends out of the socket inlet 40 and the axis of the knob end coincides with the socket axis 37. A force is then applied to the throttle cable 32 to pull the cable knob 60 past the socket retainer 45 and out of the cable socket 35 through the socket inlet 40. The ends of the retainer arms 43 are sufficiently resilient to enable them to pull apart and allow the cable knob 60 to pass through the socket retainer 45 to exit the cable socket 35.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A throttle cable linkage for a throttle valve comprising:
    a throttle cam having a shaft opening enabling placement of said throttle cam on a throttle shaft of the throttle valve so that the throttle shaft extends through said shaft opening and rotation of said throttle cam about said shaft opening produces concomitant rotation of the throttle shaft,
    said throttle cam including a cable socket having a socket axis, said cable socket further having an open socket inlet and a socket base, a portion of said cable socket between said socket inlet and base having resilient walls and constituting a socket retainer, the minimum cross section of said socket retainer in a plane which is perpendicular to said socket axis constituting a retainer cross section, said socket axis being spaced from the axis of the throttle shaft in a radial direction with respect to the axis of said shaft opening, said socket axis being perpendicular to a radial plane through the axis of said shaft opening, said cable socket having a socket inlet plane which contains said socket inlet and is perpendicular to said socket axis, said throttle cam having a pilot trough and a ramp trough, said pilot trough being oriented with respect to said ramp trough and cable socket so that said ramp trough and cable socket branch from said pilot trough with said socket base adjoining said pilot trough, the axis of the portion of said pilot trough which adjoins said socket base being coaxial with said socket axis, the end of said ramp trough opposite from said pilot trough constituting a ramp exit, said ramp exit lying in said socket inlet plane, said ramp trough having an interior ramp slot which extends along the length of said ramp trough enabling passage between said ramp trough and cable socket, said ramp slot extending into said socket base enabling passage between said pilot trough and cable socket; and a throttle cable assembly including a throttle cable having a knob end and a thickness which is smaller than the width of said ramp slot, said throttle cable assembly having a cable knob attached to said knob end, the largest cross section of said cable knob in a plane perpendicular to the axis of said knob end constituting a perpendicular knob cross section, said perpendicular knob cross section being smaller than the cross section of said socket inlet, said perpendicular knob cross section being larger than the said socket base and retainer cross section, said cable knob having a perpendicular dimension with respect to the axis of said knob end which is larger than the width of said ramp slot, said throttle cable being sufficiently stiff so that control of a portion of it away from said cable knob can enable piloting of said cable knob into said pilot trough and application of a ramp force to said cable knob, the ramp force being directed in part toward the interior of said pilot trough and in part along said socket axis causing said cable knob to pass through said pilot trough toward said ramp trough, the ramp force further causing said cable knob to pass into and through said ramp trough, the ramp force causing said cable knob to pass by said ramp exit and fall through said socket inlet plane toward said socket axis with said throttle cable falling through said ramp slot into said cable socket so that said cable knob is adjacent to said socket inlet, and application of a reverse force to said throttle cable in a parallel direction with respect to said socket axis to pull said cable knob through said socket inlet into said cable socket, the reverse force further pulling said cable knob through said socket retainer resulting in said resilient walls spreading apart and said cable knob entering the portion of said cable socket between said socket base and socket retainer so that said cable knob is captured therein.

2. A throttle cable linkage for a throttle valve comprising:

a throttle cam having a shaft opening enabling placement of said throttle cam on a throttle shaft of the throttle valve so that the throttle shaft extends through said shaft opening and rotation of said throttle cam about said shaft opening produces concomitant rotation of the throttle shaft, said throttle cam including a cable socket having a socket axis, said cable socket further having an open socket inlet and a socket base, a portion of said cable socket between said socket inlet and base having resilient walls and constituting a socket retainer, the minimum cross section of said socket retainer in a plane which is perpendicular to said socket axis constituting a retainer cross section, said socket axis being spaced from the axis of the throttle shaft in a radial direction with respect to the axis of said shaft opening, said socket axis being perpendicular to a radial plane through the axis of said shaft opening, said cable socket having a socket inlet plane which contains said socket inlet and is perpendicular to said socket axis, said throttle cam having a pilot trough and a ramp trough, said pilot trough being oriented with respect to said ramp trough and cable socket so that said ramp trough and cable socket branch from said pilot trough with said socket base adjoining said pilot trough, the axis of the portion of said pilot trough which adjoins said socket base being coaxial with said socket axis, the end of said ramp trough opposite from said pilot trough constituting a ramp exit, said ramp exit lying in said socket inlet plane, said ramp trough having an interior ramp slot which extends along the length of said ramp trough enabling passage between said ramp trough and cable socket, said ramp slot extending into said socket base enabling passage between said pilot trough and cable socket; and a throttle cable assembly including a throttle cable having a knob end and a thickness which is smaller than the width of said ramp slot, said throttle cable, assembly having a cable knob attached to said knob end, the largest cross section of said cable knob in a plane perpendicular to the axis of said knob end constituting a perpendicular knob cross section, said perpendicular knob cross section being smaller than the cross section of said socket inlet, said perpendicular knob cross section being larger than said socket base and retainer cross section, said throttle cable being sufficiently stiff so that control of a portion of it away from said cable knob can enable piloting of said cable knob into said pilot trough and application of a ramp force to said cable knob, the ramp force being directed in part toward the interior of said pilot rough and in part along said socket axis causing said cable knob to pas through said pilot trough toward said ramp trough, the ramp force further causing said cable knob to pass into and through said ramp trough, the ramp force causing said cable knob to pass by said ramp exit and fall through said socket inlet plane toward said socket axis with said throttle cable falling through said ramp slot into said cable socket so that said cable knob is adjacent to said socket inlet, and application of a reverse force to said throttle cable in a parallel direction with respect to said socket axis to pull said cable knob through said socket inlet into said cable socket, the reverse force further pulling said cable knob through said socket retainer resulting in said resilient walls spreading apart and said cable knob entering the portion of said cable socket between said socket base and socket retainer so that said cable knob is captured therein.

* * * * *